United States Patent [19]

Danner

[11] Patent Number: 5,783,618
[45] Date of Patent: Jul. 21, 1998

[54] AQUEOUS WAX AND SILICONE DISPERSIONS, THEIR PROUDUCTION AND USE

[75] Inventor: Bernard Danner, Riedisheim, France

[73] Assignee: Clariant Finance (BVI) Limited, Tortola, Virgin Islands (Br.)

[21] Appl. No.: 679,780

[22] Filed: Jul. 15, 1996

Related U.S. Application Data

[63] Continuation of Ser. No. 297,457, Aug. 29, 1994, abandoned.

[30] Foreign Application Priority Data

Aug. 31, 1993 [DE] Germany .................. 43 29 244.5

[51] Int. Cl.$^6$ .................................................. C08L 91/06
[52] U.S. Cl. .................................... 524/275; 524/279
[58] Field of Search .................................... 524/275, 279

[56] References Cited

U.S. PATENT DOCUMENTS

| | | | |
|---|---|---|---|
| 3,983,272 | 9/1976 | Huber et al. | 427/407 |
| 4,055,433 | 10/1977 | Morones | 106/10 |
| 4,329,390 | 5/1982 | Danner | 428/264 |
| 4,434,008 | 2/1984 | Dumm | 106/271 |
| 4,960,431 | 10/1990 | Cordova | 8/115.6 |
| 5,000,861 | 3/1991 | Yang | 252/8.6 |
| 5,073,593 | 12/1991 | Ozaki et al. | 524/767 |
| 5,075,403 | 12/1991 | Kirk | 528/15 |
| 5,078,747 | 1/1992 | Kastele | 8/181 |
| 5,147,578 | 9/1992 | Kirk | 252/358 |
| 5,221,728 | 6/1993 | Bennett et al. | 528/125 |
| 5,244,598 | 9/1993 | Merrifield et al. | 252/314 |
| 5,302,659 | 4/1994 | Bindl et al. | 524/838 |
| 5,310,772 | 5/1994 | Blanck | 524/262 |
| 5,389,136 | 2/1995 | Danner | 106/271 |

FOREIGN PATENT DOCUMENTS

| | | |
|---|---|---|
| 0 063 311 | 10/1982 | European Pat. Off. . |
| 0 220 400 | 5/1987 | European Pat. Off. . |
| 0404027 | 12/1990 | European Pat. Off. . |
| 0 412 324 | 2/1991 | European Pat. Off. . |
| 0415254 | 3/1991 | European Pat. Off. . |
| 0532256 | 3/1993 | European Pat. Off. . |
| 0 535 437 | 4/1993 | European Pat. Off. . |
| 94810488 | 12/1994 | European Pat. Off. . |
| 3003851 | 8/1980 | Germany . |
| 4206714 | 9/1993 | Germany . |
| 4211269 | 10/1993 | Germany . |
| 4222483 | 1/1994 | Germany . |
| 1208053 | 1/1986 | U.S.S.R. . |
| 2 177 720 | 1/1987 | United Kingdom . |
| WO 92/04409 | 3/1992 | WIPO . |

OTHER PUBLICATIONS

EPO Search Report for eq EP 94 81 0488, dated 22 Dec., 1994.
Handbuch der Textilhilfsmittel, Verlag Chemie, Weinheim, New York, 1977, pp. 688–690.
Derwent Abstract, DE4211269/PN.
Derwent Abstract, DE4222483/PN.
Derwent Research Disclosure RD–307109.
Dictionary of Chemistry (German/English), Gerhard Wenske, pp. 1197–1198.
Chemie Lexikon, Prof. Dr. Hermann Rompp, pp. 4357–4358.

*Primary Examiner*—Melvyn I. Marquis
*Attorney, Agent, or Firm*—Hesna J. Pfeiffer

[57] ABSTRACT

Aqueous, dispersant-containing wax- and polysiloxane-dispersions (P) containing
as wax
  (A) at least one oxidized hydrocarbon wax of needle-penetration (according to ASTM D-1321)$\leqq 4$ dim and optionally
  (B) at least one non-oxidized hydrocarbeon wax
and as polydiorganosiloxane
  (C) at least one optionally amino-modified and/or non-ionically modified polydiorganosiloxane with a nitrogen-content<0.6% by weight
and suitably a dispersant system which is
  (D) a non-ionogenic, cationic or amphoteric dispersant system,
are suitable as finishing agents, in particular as highly permanent softeners and sewability improving agents, especially for textile white goods.

12 Claims, No Drawings

AQUEOUS WAX AND SILICONE DISPERSIONS, THEIR PROUDUCTION AND USE

This is a continuation of application Ser. No. 08/297,457, filled Aug. 29, 1994, now abandonded.

In the finishing of textile material for imparting an improved soft handle it is desired to meet the ever growing requirements set to the softening finishes, be it for wearing comfort of clothes, be it for the ready-making and any further handling of the goods, which is in particular of importance for permanent softening finishes. For permanent softening finishes there are mostly employed silicone-based softeners with which there may be obtained softening finishes of high permanence, but although there may be achieved a more or less efficient softening finish, this displays often especially in ready-making of the goods - the less desired character of a "flowing" soft handle or also the not always desired typical "silicone-soft-handle". In the finishing with wax compositions there may be obtained in general semi-permanent finishes which mostly display a not particularly pronounced soft-handle. In the softening finishing of white goods, i.e. of optically brightened goods, some softening agents may impair the optical brightenings in an unforseeable way and/or to an unforseeable extent.

It has now surprisingly been found, that by combining certain softening silicones that are poor in nitrogen with certain oxidized waxes of particularly high hardness and optionally further additives as described below, there are obtainable softener-compositions which display a good stability to storage and also during application and with which there may be achieved highly permanent finishings of outstanding very pleasant soft handle, while the compositions are also compatible with further components that may be present in the treatment-liquors, and have a positive influence on the sewability of the goods, and do practically not impair the sorptivity of the substrate. There are obtainable in particular white goods of optimum whiteness.

The invention relates to the defined wax- and polydiorganosiloxane-containing dispersions (P), their production and their use as finishing agents.

The invention, thus, provides an aqueous dispersant-containing wax- and polydiorganosiloxane-dispersion (P) containing as wax (A) at least one oxidized hydrocarbon wax of needle-penetration (according to ASTM D-1321)≦4 dmm and optionally (B) at least one non-oxidized hydrocarbon wax and as polydiorganosiloxane (C) at least one optionally amino-modified and/or non-ionically modified polydiorganosiloxane with a nitrogen-content<0.6 % by weight.

The waxes (A) are essentially carboxy-group-containing, oxidized and optionally partially saponified hydrocarbon waxes.

As carboxy-group-containing, oxidized and optionally partially saponified hydrocarbon waxes (A) come in general into consideration any synthetic and/or mineral waxes that in the oxidized form still have a wax-structure and display a needle-penetration (according to ASTM D-1321)≦4 dmm, e.g. oxidized microwaxes or oxidized polyolefin waxes (principally polyethylene waxes), or further waxes that are synthesized optionally directly in oxidized form, e.g. Fischer-Tropsch waxes or also their oxidation waxes, and where the mentioned oxidized waxes, especially the oxidized polyolefin waxes and the Fischer-Tropsch waxes, may optionally be partially saponified. Among the mentioned waxes (A) are preferred the oxidized and optionally partially saponified microwaxes, Fisher-Tropsch waxes and, in particular polyethylene waxes. Such waxes are in general known and may, besides the needle-penetration, be further characterized by other conventional parameters, such as dripping point, acid number and optionally saponification number, density, molecular weight and/or solidification point. The needle-penetration may be determined e.g. according to the standard norm ASTM D-1321 or also by other standard test methods that are equivalent to this (e.g. by DIN 51579 or DGF M-III-9b). The needle-penetration of (A) by ASTM D-1321 is advantageously in the range of from 0.1 to 4 dmm, preferably 0.1 to 2.5 dmm. The dripping point of (A) is preferably ≧80° C., in particular within the temperature range of 80 to 150° C.; the acid number of (A) is advantageously in the range of 5 to 80, preferably 10 to 50. The saponification number of (A) is advantageously in the range of from 10 to 120, preferably 20 to 80. Among the oxidized microwaxes are preferred those whose dripping point is within the temperature range of from 90°0 to 120° C.; among the oxidized, optionally partially saponified polyethylene waxes are preferred those whose dripping point is within the temperature range of from 95° to 150° C., especially 102° to 150° C.; among the Fischer-Tropsch waxes are preferred in particular the partially saponified Fischer-Tropsch waxes the dripping point of which is in the temperature range of 85° to 120° C. The density of the mentioned waxes (A) is advantageously in the range of from 0.94 to 1.05 g/cm$^3$ at 20° C., there being preferred among the oxidized polyethylene waxes in particular those whose density is in the range of 0.96 to 1.02 g/cm$^3$ at 20° C. Among the oxidized polyethylene waxes are in particular preferred the ones with an average molecular weight $\overline{M}_w$, in the range of 1000 to 20000.

The waxes (A) may be unitary oxidized waxes or also mixtures of such oxidized waxes, in particular mixtures of oxidized polyethylene waxes with oxidized microwaxes and/or Fischer-Tropsch waxes or mixtures of oxidized microwaxes with Fischer-Tropsch waxes.

As waxes (B) come essentially into consideration paraffin waxes, in particular those obtainable by working-up of petroleum and/or of residues of the petroleum distillation, principally refined paraffins. Such waxes may also be characterized by conventional parameters, e.g. by their needle-penetration and optionally by their solidification point and/ or dripping point. The needle-penetration according to ASTM D-1321 is advantageously ≦40 dmm, preferably in the range of 0.5 to 20 dmm. The dripping point is advantageously ≧40° C., preferably in the range of from 45° to 112° C.

The weight ratio (B)/(A) is in particular in the range of from 0 to 2:1, advantageously 0 to 1.5:1, preferably 0 to 1:1. If (B) is employed, the weight ratio (B)/(A) is preferably ≧0.05:1, in particular ≧0.1:1.

As polydiorganosiloxanes (C) are suitable in general any polydiorganosiloxanes containing Si-linked, preferably aliphatic, optionally amino-substituted and/or non-ionogenically substituted hydrocarbon radicals and which are dispersible in water with the aid of suitable dispersants. [As a nonionogenic compound or substituent there is meant a compound or substituent that is non-ionic and also dose not generate ions in water and /or in the presence of the other components of (P)]. Advantageously these hydrocarbon radicals bear either no modifying substituents or, if they bear any modifying substituents, the latter are either non-ionogenic substituents or preferably aliphatic aminogroups which are linked to Si over the said hydrocarbon bridges. The available amino groups may optionally be substituted, in particular aliphatically (open-chain or cyclic) substituted or amidated, preferably acylated with the acyl radical of an aliphatic carboxylic acid. As these N-containing groups come principally into consideration those of the below-defined formula —Y—NH—$R_1$ or/and acylation products thereof. As (C) there may e.g. be employed such polydiorganosiloxanes as are known as textile finishing agents, in particular as textile softeners, or as are usable analogously thereto. Preference is given to polydimethylsiloxanes which may be hydroxy-, ethoxy-, methoxy-, ethyl- or methyl-terminated and which optionally contain siloxy units which are amino-substituted over a lower aliphatic hydrocarbon radical. Preferably the polydiorganosiloxanes (C) to be employed are built-up of repeating units of the following formulae

and optionally

and optionally ($c_3$) alkylation- or/and acylation products of units of formula (c 2),
wherein Y signifies a divalent hydrocarbon radical with 2 to 6 carbon atoms, $R_1$ signifies hydrogen, $C_{1-4}$-alkyl, cyclohexyl or —$(CH_2)_m$—$NH_2$ m signifies 2 or 3, $R_2$ signifies —$CH_3$ or —O—$G_1$ and $G_1$ signifies hydrogen, methyl or the b on d to a radical of the below indicated formulae ($c_4$) or ($c_5$) or to ($c_6$) or to a polysiloxane radical of units ($c_1$) and/or ($c3_2$) and/or ($c_3$).

The terminal groups of the polysiloxane chains correspond preferably to the formulae

and/or

and/or ($c_6$): alkylation and/or acylation products of units of formula ($c_5$),
in which $G_2$ signifies methyl, ethyl, methoxy, ethoxy or hydroxy.

In the formulae ($c_2$), ($c_3$), ($c_5$) and ($c_6$) Y signifies advantageously an aliphatic, preferably saturated hydrocarbon radical with 3 to 4 carbon atoms, in particular propylene-1,3 or 2-methyl-propylene-1,3.

$R_1$ signifies advantageously hydrogen, cyclohexyl or —$(CH_2)_2$—$NH_2$, preferably aminoethyl or aminopropyl, in particular aminoethyl.

$R_2$ preferably signifies methyl.

The polydiorganosiloxanes (C) may be unitary polysiloxanes or mixtures of different polysiloxanes. Their viscosity is advantageously in the range of 500 to 30,000, principally 700 to 20,000, preferably 800 to 15,000 cP (Brookfield, rotational viscometer Rv, Spindle No. 5, 200C). The average amine number of the (total) polydiorganosiloxanes (C) is advantageously in the range of 0 to 0.4; if the polydiorganosiloxanes (C) are amino-group-containing their amine number (before any optional acylation) is preferably in the range of 0.001 to 0.4, preferably 0.01 to 0.35. The nitrogen content of (C) is advantageously in the range of from 0 to 0.5% by weight, preferably 0 to 0.47% by weight, most preferably in the range of 0.014 to 0.47% by weight.

As amine number of a product (i.e. the number of moles of neutralizable amino groups in 1000 g or product) there is meant here the number of moles of hydrochloric acid that are required in order to neutralize 1000 g of the non-protonated product. Schematically the optionally amino-modified preferred polydiorganosiloxanes (C) may be represented by the following general formula

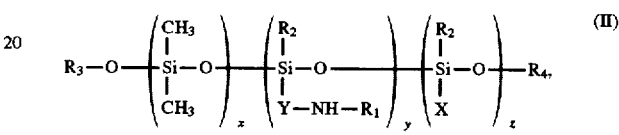

in which $R_3$ and $R_4$ each signify a group of formula ($c_4$), ($c_5$) or ($c_6$) and X signifies a radical resulting from the alkylation and/or acylation of the radical —Y—NH—$R_1$ and the indexes x, y and z are chosen so that the polymer displays the above indicated values for amine number and viscosity.

The amino-modified polydiorganosiloxanes (C) may be produced in a manner known per se or analogously to known methods, e.g. by aminoalkylation of corresponding polydiorganosiloxanes that contain Si-linked reactive hydrogen atoms or preferably by reaction of amino-group-containing silanes with non-ionogenic reactive mono- or polydiorganosiloxanes, in particular with α,ω-dihydroxypolydimethylsiloxanes which advantageously have an average molecular weight $\overline{M}_w$ in the range of 500 to 10,000, preferably 1000 to 7000, or cyclic siloxanes, e.g. hexamethylcyclotrisiloxane or/and octamethylcyclotetrasiloxane. As aminosilanes come principally into consideration aminosubstituted trimethoxysilanes or dimethoxymethylsilanes, in which the aminogroup is linked to the silicon atom over carbon and corresponds preferably to the formula —Y—NH—$R_1$ and optionally –X. Preferred radicals —Y—NH—$R_1$ are γ-aminopropyl and γ-(β-aminoethylamino)-propyl.

If desired, the amino groups present in the amino-modified polysiloxane molecule may be alkylated e.g. with $C_{1-12}$-alkyl groups. These alkyl groups may be linear or, if they contain 3 to 12 carbon atoms, also branched or, if they contain ≧6 carbon atoms, also cyclic; among these are preferred the $C_{4-9}$-aliphatic radicals, in particular $C_{6-9}$-cycloaliphatic radicals.

According to a further variant, the amino groups in the amino-group-containing polydiorganosiloxanes may at least in part be acylated, e.g. with aliphatic carboxylic acid radicals containing 2 to 12 carbon atoms, preferably those containing 2 to 8 carbon atoms and which are either unsubstituted or, if they contain 4 to 8 carbon atoms, are preferably hydroxy-substituted.

The alkylation of amino groups in the polydiorganosiloxane may be partial or exhaustive; advantageously at least 20 mol-%, in particular 40 to 100 mol-% of the available alkylatable amino groups are alkylated. The production thereof may take place in known manner, e.g. as described in EP 306 935 A2 (≡ U.S. Pat. 4,874,662), the content of which is incorporated herein by reference.

For the introduction of acyl groups there may be employed for instance the corresponding acid anhydrides or, for hydroxy-substituted acyl groups, in particular the corresponding lactones (e.g. γ-butyrolactone, γ- or δ-valerolactone and γ-, δ- or ε-caprolactone). The available amino groups may be acylated partially or even exhaustively, there may e.g. be acylated 10 to 100, preferably 30 to 90 mol-% of the available amino groups. According to a preferred feature of the invention, the acylated aminopolysiloxanes (C) derive from the acylation of polydiorganosiloxanes (C) containing Si-linked radicals of the formula

  (y1)

in which the primary amino groups are predominently acylated; advantageously at least 40%, in particular 50 to 90% of the amino groups are acylated, the primary aminogroups being preponderantly acylated. With particular preference all of the primary aminogroups are acylated, so that the acylated derivative instead of the groups of formula (y1) contains groups of the following formulae

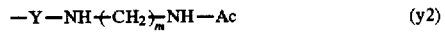  (y2)

and optionally

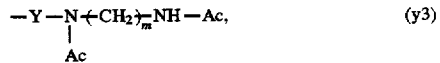  (y3)

wherein Ac signifies the acid radical introduced by acylation.

The production of aminofunctional polydiorganosiloxanes may take place in a manner known per se, e.g. as described in U.S. Pat. Nos. 2,947,771 and 4,419,391, in French Patent 2 440 961 and in published European Patent Applications EP-A 55 606 (≡U.S. Pat. 4 388 437), EP-A 68 671 and EP-A 417 047 (corresponding to U.S.A. patent applications Ser. No. 08/171,782 filed on Dec. 21, 1993 and Ser. No. 08/192,227 filed on 4th Feb. 1994). The acylation of aminofunctional polydiorganosiloxanes may also take place in a manner known per se, e.g. as described in U.S. Pat. Nos. 2,929,829, 3,440,261 and 4,507,455 or in EP 342 830 A2 (≡ U.S. Pat. No. 5,100,991). The content of the mentioned patents and published patent applications is incorporated herein by reference.

There may be employed unitary polydiorganosiloxanes or also mixtures of different polydiorganosiloxanes, e.g. of simple polydimethylsiloxanes, that do not contain any further substituents besides the dimethylsiloxy units and the end groups $G_2$, and amino-functional polydimethylsiloxanes, in which the aminogroups may optionally be modified as described above.

The above indicated amine-number represents in general an average number which in the amino-modified, optionally acylated polydiorganosiloxanes is preferably in the range of from 0.001 to 0.4 and may refer as well to a unitary aminopolydiorganosiloxane as (e.g. at an amine number<0.15) also to mixtures of aminogroup-containing polydiorganosiloxanes and polydiorganosiloxanes that are free of aminogroups.

Preferably (C) is nitrogen-containing; with particular preference it contains optionally acylated aminogroups —Y—NH—$R_1$, and the amine-number (before acylation) is advantageously in the range of 0.01 to 0.35. Preferably the groups —Y—NH—$R_1$ not acylated and are most preferably of formula (y1).

The weight ratio (C)/(A) in the dispersions (P) of the invention may vary in a broad scope, suitably in an efficient range, advantageously in the range of 0.01:1 to 20:1, preferably 0.05:1 to 15:1, in particular 0.1:1 to 10:1.

The aqueous compositions (P) of the invention contain the waxes (A) and optionally (B) and the polydiorganosiloxanes (C) in dispersed form, for which there are employed expediently dispersants. As dispersants come into consideration ($D$) non-ionogenic, cationic or amphoteric dispersant systems.

The respective dispersant system (D) may consist of one or more surfactants, in particular of ($D_O$) a non-ionogenic surfactant or a mixture of non-ionogenic surfactants, ($D_k$) a cationic surfactant or a mixture of cationic surfactants, and/or ($D_x$) an amphoteric surfactant or a mixture of amphoteric surfactants.

As non-ionogenic surfactants ($D_O$) there may be employed in general known compounds that contain at least one lipophilic radical and at least one non-ionogenic hydrophilic radical, and the HLB-values of which may be e.g. in the range of 2 to 16, and which may be of aliphatic and optionally also aromatic character; preferably the surfactants ($D_O$) are purely aliphatic. There may be mentioned for instance the following categories of surfactants: oxyethylation products of higher fatty acids or fatty acid amides, of higher fatty alcohols or mono- or di-alkylphenols, fatty acid partial esters of polyols (e.g. glycerine, sorbitan or sorbitol) and their oxyalkylation products; optionally the oxyethylation products may contain a minor proportion of propyleneoxy units. Particularly worth mention are sorbitan monoesters of $C_{8-16}$- (preferably $C_{11-14}$-) -fatty acids and oxyethylation products of fatty alcohols or fatty acid amides in which the fatty radical contains advantageously 8 to 22, preferably 10 to 18, carbon atoms. There may in particular be mentioned oxyethylation products of the following fatty alcohols and fatty acid amides: lauryl alcohol, myristyl alcohol, cetyl alcohol, oleyl alcohol, stearyl alcohol and technical grade mixtures of alcohols, in particular optionally hydrogenated or distilled tallow fatty alcohol and coconut fatty alcohol, as well as the analogous fatty acid amides, and little- or highly-branched primary or secondary synthetic alcohols, e.g. those from the oxosynthesis (e.g. from propylene), among which are preferred those with 10 to 15 carbon atoms, principally trimethylnonanol, tetramethylnonanol and tetramethyldecanol, in particular the primary isotridecyl alcohol tetramethylnonanol-1, and also secondary saturated $C_{13-16}$-fatty alcohols. If desired there may also be added non-ionogenic surfactants of HLB≧16, as protective colloids.

As cationic surfactants ($D_K$) come in general into consideration, conventional cationic surfactants that contain at least one lipophilic hydrocarbon radical and at least one hydrophilic cationic group; as hydrophilic cationic groups come in particular into consideration basic aminogroups and their protonated and/or quaternated derivatives, principally tertiary aminogroups and protonated or quaternary ammonium groups. The ammonium groups may optionally belong to a heterocycle e.g. to a pyridinium- or imidazolinium-ring. Optionally the nitrogen atoms may be substituted with hydroxyethyl or polyethyleneglycol chains. There may in particular be mentioned the cationic surfactants of the following formula

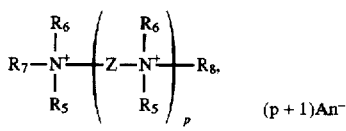

(III)

in which

R₅ signify each independently $C_{1-4}$-alkyl or a radical of the formula $-(CH_2-CH_2-O)_q-H$.

R₆ signify each independently hydrogen, $C_{1-4}$-alkyl, -β-hydroxyethyl or benzyl, R₇ signifies a radical of the formula $R_9-CH_2-$, $R_9-CO-NH-Z-$, $R_9-CO-O-Z'$ or $R_9-CH_2-O-Z''-$, R₈ signifies $C_{1-4}$-alkyl, a radical of the formula $-(CH_2-CH_2O)_q-H$ or R₇, R₉ signifies an aliphatic hydrocarbon radical with 7 to 23 carbon atoms, z signifies $C_{2-6}$-alkylene, z' signifies $C_{2-6}$-alkylene, z" signifies $C_{2-6}$-alkylene or $-CH_2-CHOH-CH_2-$, p signifies a number from 0 to 2, preferably 0 to 1, q signifies independently at least 1, Σq being ≦70, and An signifies a counterion to the ammonium cation.

If in formula (III) R₆ signifies hydrogen, there may advantageously be employed the corresponding protonatable free bases of the formula

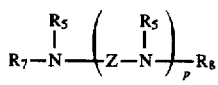

(IV)

which may then be protonated.

The radical R₉ contains advantageously 11 to 21 carbon atoms. As radicals $R_9-CH_2-$ come into consideration principally the following: lauryl, palmityl, cetyl, oleyl, stearyl, behenyl, arachidyl, tallowalkyl and cocoalkyl, among which are preferred those with 12 to 18 carbon atoms. As radicals $R_9-CO-$ come in particular into consideration the acyl radicals of the corresponding fatty acids, e.g. lauroyl, palmitoyl, myristoyl, oleoyl, stearoyl, behenoyl and arachidoyl, and the radicals of technical fatty acids, e.g. of tallow fatty acid and coconut fatty acid, among which are preferred those with 12 to 18 carbon atoms.

If more than one radical Z is present in the molecule these may have the same significance of different significances.

Z signifies preferably Z₁, i.e. ethylene or propylene, among which propylene-1,3 is particularly preferred.

Z' signifies preferably Z₂, i.e. ethylene or propylene, among which ethylene is particularly preferred.

Z" preferably signifies ethylene, propylene or 2-hydroxypropylene-1,3.

R₅ preferably signifies methyl, ethyl or a radical of the formula $-(CH_2-CH_2-O)_{q1}-H$.

R₆ preferably signifies hydrogen, $C_{1-4}$-alkyl or benzyl, more preferably hydrogen.

p signifies preferably 0 or 1.

R₇ preferably signifies R₇', i.e. a radical of the formula $R_9-CH_2-$, $R_9-CO-O-Z_2-$ or $R_9-CO-NH-Z_1-$.

R₈ signifies preferably $C_{1-4}$-alkyl or a radical of the formula $-(CH_2-CH_2-O)_{q1}-H$.

q₁ signifies at least 1, Σq1 being ≦40, preferably Σq1 signifies 1 to 20.

In a preferred sub-group of cationic surfactants (D_K) of the formula (III)

R₅ signifies R₅', i.e. methyl or ethyl or a radical of the formula $-(CH_2-CH_2-O)_{q1}-H$.

R₆ signifies hydrogen,

R₈ signifies R₈', i.e. a radical of the formula $-(CH_2-CH_2-O)_{q1}-H$. p signifies p', i.e. 0 or 1 and q signifies $q_1$, i.e. at least 1, Σq1 equalling 1 to 40, preferably 1 to 20; An signifies in this a counterion as is formed by protonation.

Preferred amines of formula (IV) correspond to formula (IV')

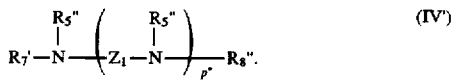

(IV')

As amphoteric surfactants (Di) come into consideration in general any amphoteric surfactants, e.g. as are described in B.R. BLUESTEIN and Clifford L. HILTON "Amphoteric Surfactants" (Volume 12 of "Surfactants Science Series" Marcel DEKKER Inc., New York and Basel, 1982) especially in Chapters 1 to 4. Essentially come into consideration those surfactants that, besides a lipophilic hydrocarbon radical and an anionic group (respectively acid group), contain in the molecule at least one tertiary optionally protonated amino group or quaternary ammonium group. Advantageously as (D_x) there are employed those amphoteric surfactants in which the anionic group (indicated as free acid group) is a carboxylic or sulphonic acid group and the lipophilic hydrocarbon radical is an aliphatic fatty radical which is linked over a carbamoyl group to the remaining portion of the molecule or is the 2-positioned substituent of an amphoteric imidazoline or of the imidazolinium ring of a betaine of the imidazolinium series. Preferably as amphoteric surfactants (D_x) there are employed compounds corresponding to formulae (II), (III), (IV) or/and (V) [respectively (Vbis)] of EP 417 047 A2 (corresponding to U.S.A. patent applications Ser. No. 08/171,782 filed on 21st Dec. 1993 and Ser. No. 08/192,227 filed on Feb. 4, 1994), the content of which is incorporated herein by reference. Among the mentioned amphoteric surfactants are particularly preferred those of the following formula

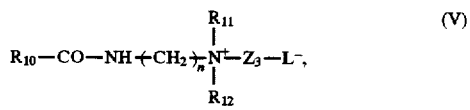

(V)

in which $R_{10}-CO-$ signifies the the acyl radical of a fatty acid with 8 to 24 carbon atoms, $R_{11}$ signifies hydrogen, $C_{1-4}$-alkyl, $C_{2-4}$-hydroxyalkyl or benzyl, $R_{12}$ signifies $C_{1-4}$-alkyl or $C_{2-4}$-hydroxyalkyl, $Z_3$ signifies $C_{1-3}$-alkylene or 2-hydroxypropylene-1,3, $L^-$ signifies $-COO^-$ or $-SO_3^-$, and n signifies 2 to 6.

$R_{10}-CO-$ stands advantageously for the acyl radical of an aliphatic fatty acid with 12 to 20, preferably 14 to 18 carbon atoms, in particular as listed above.

$R_{11}$ stands preferably for hydrogen, methyl, ethyl,β—hydroxypropyl or β—hydroxyethyl, among which hydrogen and methyl are particularly preferred.

$R_{12}$ stands preferably for methyl, ethyl, β-hydroxyethyl or β-hydroxypropyl, among which methyl and especially O-hydroxyethyl are preferred.

$-Z_3-L^-$ stands preferably for the carboxymethyl group or with particular preference for the 2-hydroxy-3-sulphopropyl-1-group.

If in the above formula (V) $R_{11}$ signifies hydrogen, this formula represents the inner salt form; depending on the pH, in particular under alkaline pH-values, the respective compound is also in the form of the corresponding external salt.

The kind and quantity of surfactants (D) is suitably chosen so that a corresponding aqueous dispersion (P) of wax and polydiorganosiloxane can be formed.

Preferably (D) contains at least 10% by weight of ($D_O$), in particular 30 to 100 % by weight of ($D_O$).

The dispersions (P) of the invention may be produced by admixing with each other the respective components to form the corresponding dispersion. Advantageously an aqueous wax dispersion (W), that contains the waxes (A) and—if present—(B), is mixed with an aqueous dispersion (S) of the polydiorganosiloxanes (C), where at least a part of the dispersants (D) is contained in these dispersions and any residual and further dispersant (D) and/or additional water as also further optional additions [e.g. (E), (F) and/or (G) as defined below] may be admixed therewith simultaneously or subsequently.

With particular preference there is produced an aqueous dispersion (W') of the waxes (A) and (B), that contains as dispersant ($D_1$) at least one cationic surfactant (D) and/or at least one amphoteric surfactant ($D_x$) and/or at least one non-ionogenic surfactant ($D_O$)

and this is admixed with an aqueous dispersion (S') of (C), that contains as dispersing agent ($D_2$) at least one non-ionogenic surfactant ($D_O$) and optionally at least one amphoteric surfactant ($D_x$) and/ or at least one cationic surfactant ($D_K$), and optionally with further surfactant (D) and/or water.

($D_1$) is advantageously a dispersant system of non-ionogenic character, i.e. it consists of ($D_O$), or of cationic character, i.e. it consists of ($D_O$) or of cationic character, i.e. it consists of ($D_K$) optionally in admixture with ($D_O$), or of amphoteric character, i.e. it consists of ($D_x$) optionally in admixture with ($D_O$) and/or with ($D_K$).

The weight ratio of ($D_1$) to the wax [(A) and, if present, (B)] is expediently chosen such that an aqueous dispersion may be formed, and is in particular in the range of 10 to 60, advantageously 20 to 50, preferably 25 to 40 parts by weight of ($D_1$) for every hundred parts by weight of total wax.

Advantageously there are produced aqueous concentrated wax dispersions (W), respectively (W'), of fine particle size and with a dry substance content preferably in the range of 10 to 50, especially 15 to 40% by weight.

The wax dispersions may be produced in a manner known per se, in particular by admixing the waxes and surfactants in the melt and then diluting with water. The production of wax dispersions (W), in particular (W'), that contain cationic dispersants ($D_k$) optionally in admixture with non-ionogenic dispersants ($D_O$) is carried out advantageously as described in DE 30 03 851 A1 (equivalent to U.S. Pat. No. 4,329,390) and in particular so as preferred therein or anialogously thereto.

For the production of a dispersion (S), especially (SI), the polydiorganosiloxanes (C) may be dispersed in water advantageously with a dispersant system (D) in a manner known per se, preferably so that a very fine dispersion or even a microdispersion is formed. As a fine dispersion there is in particular meant such a dispersion whose dispersed particles have preponderantly a particle size ≦5 μm, in particular so that practically all dispersed particles have a particle size ≦2 μm; as a microdispersion there is meant such a dispersion in which the dispersed particles have preponderantly a particle size ≦0.2 μm, especially so that practically all dispersed particles have a particle size ≦0.1 μm. Occasionally the light transmission of the composition may also be used as a means for assessing the fineness of the particles of the dispersion. The scopes of the particle sizes may be assessed e.g. by measurement of the light-scattering (e.g. laser-light-scattering).

The silicone dispersions (S) respectively (S') may be produced in a manner known per se, expediently by suitable mixing of the respective surfactants, in particular ($D_O$) and optionally ($D_K$) or/and ($D_x$), with the respective silicones (C) and the required amount of water. With amino-functional silicones (C) it is of particular advantage to set the pH of the dispersions to acidic values, i.e. <pH 7, preferably in the pH-range of 3 to 6.5. The non-ionogenic surfactants ($D_O$) are advantageously of an HLB-value in the range of 7 to 16; it being particularly preferred to employ a mixture of at least two non-ionogenic surfactants ($D_O$), viz. of non-ionogenic surfactants ($D_O$) of more silicone-friendly character, i.e. in particular more lipophilic surfactants ($D_O$) preferably with an HLB in the range of 7 to 12, and more hydrophilic surfactants ($D_O$), i.e. in particular surfactants ($D_O$) with an HLB that is preferably in the range of 12 to 16, the ELB-value of the more hydrophilic surfactant ($D_O$) being higher than the one of the more lipophilic surfactant ($D_O$) advantageously by at least 0.5 units, in particular by 1 to 4 units. The weight ratio of the more hydrophilic non-ionogenic surfactant ($D_O$) to the more lipophilic non-ionogenic surfactant ($D_O$) in ($D_2$) is advantageously in the range of 0.5:1 to 8:1, principally 0.75:1 to 5:1, preferably 1.3:1 to 3:1. If there is employed ($D_x$) the weight ratio ($D_x$)/(C) is advantageously in the range of 0.05:1 to 0.7:1, preferably 0.1:1 to 0.5:1. The weight ratio ($D_O$)/(C) is advantageously in the range of 0.05:1 to 0.6:1, preferably 0.07:1 to 0.5:1. The weight ratio ($D_K$)/(C) in (S) is advantageously in the range of from 0 to 0.6:1, preferably 0 to 0.3:1.

In order to disperse (C) for the production of (S) there is preferably employed ($D_O$) and optionally ($D_x$), with particular preference only ($D_O$).

The aqueous silicone dispersions (S), in particular (S'), contain advantageously 0.05 to 1.1, preferably 0.1 to 0.9 parts by weight of ($D_2$) for every part by weight of (C). The dry substance content of these dispersions (S) respectively (S') is advantageously in the range of 15 to 70% by weight, preferably 20 to 60% by weight, in particular 25 to 50% by weight; the pH is advantageously in the range of 3 to 9, preferably 4 to 8.

By suitable choice of the silicones (C) and surfactants ($D_2$), sequence of the additions, choice of the respective temperatures and pH-values and also kind and working conditions of the mixing equipment, there may be produced very fine dispersions, in particular also microdispersions. The production of silicone dispersions is in general known in the art and is also described in the specialized literature. As dispersions (S) there may e.g. be employed also such as are obtainable by the production methods described in the laid-open European Patent Applications EP 138 192 A1 (≡U.S. Pat. No. 4,620,878), EP 186 847 A1 (≡U.S. Pat. 4 661 551), EP 378 828 A2 (≡U.S. Pat. No. 5,281,658) and EP 417 047 A2 (equivalent to U.S. patent applications Ser. No. 08/171,782 filed on Dec.21, 1993 and Ser. No. 08/192,227 filed on Feb.4, 1994), in U.S. Pat. Nos. 4,380,503 and 4,816,506, in published British Patent Applications GB-A 1 191 289, 1 598 845 and 2 215 729, in published French Patent Application FR-A 2 333 562, in East German Patent 133 196 and in "TORAY Technical Information M-011 about TORAY Silicone SF 8417 Fluid". The content of all these documents is incorporated herein by reference.

The wax/surfactant mixtures are advantageously dispersed in water at temperatures that correspond at least in part to the melting range of the waxes, whereupon they may be cooled.

The polydiorganosiloxanes (C) may be dispersed by various methods, e.g. as described in the above indicated reference literature.

The two dispersions (V) and (S), especially (W') and (S'), may be mixed with each other and, if required, with water, e.g. at temperatures in the range from 10° C. to temperatures in the melting range of the waxes, or e.g. the still hot wax dispersion (W) (e.g. of 80° to 95° C.) may be stirred directly or upon previous dilution with water into the cold silicone dispersion (S) (e.g. of 10° to 30° C.), or vice-versa the cold silicone dispersion (S) may be stirred into the still hot wax dispersion (W) the heating being switched-off and subsequently, if required, be diluted with water. If desired, further dispersant (D) and/or water may be added. If further dispersant (D) is added separately, this is advantageously ($D_3$) at least one cationic dispersant (D) and/or at least one amphoteric dispersant ($D_X$) and/or at least one non-ionogenic dispersant ($D_O$).

Preferably ($D_3$) consists of at least one cationic dispersant ($D_K$) or of at least one non-ionogenic dispersant ($D_O$) or of a mixture thereof. According to a preferred feature a portion of ($D_O$) is added separately when mixing (W) with (S).

The total surfactants (D) [preferably in the form of ($D_1$) and ($D_2$) and optionally additional dispersant (D) e.g. ($D_3$)], are advantageously chosen so that in the produced dispersion (P) the weight ratio of the total surfactants (D) to [(A)+(B)+(C)] is in the range of 0.05:1 to 1.8:1, preferably 0.08:1 to 0.6:1, especially 0.1:1 to 0.5:1.

The dry substance content of the aqueous dispersions (P) of the invention is advantageously in the range of 5 to 50, preferably 8 to 40% by weight referred to the total weight of (P).

The pH of the dispersions (P) is advantageously in the weakly basic to distinctly acidic range, advantageously in the pH-range from 3 to 9, preferably in the nearly neutral to weakly acidic range, in particular in the pH-range of 3 to 7, more preferably in the weakly acidic range, especially in the pH-range of 3.5 to 6.

Besides the mentioned components (A), (C) and (D) and optionally (B), the aqueous dispersions (P) of the invention may optionally contain, minor proportions of further additions, in particular (E) at least one acid and/or at least one base for pH-adjustment;

(F) at least one organic solvent and/or at least one hydrotrope, in particular from the production of polysiloxanes respectively (C)-dispersions;

and/or (G) at least one preserving agent and/or at least one perfume.

Components (E) are in general conventional bases or acids, in particular as described in EP 417 047 A2.

Components (F) are mainly those described in EP 417 047 A2 and are advantageously employed in the there indicated quantitative ratios. As (F) there may however also be used cumene sulphonate.

As preserving agents (G) come into consideration before all biocides (fungicides or bactericides) and/or anti-freeze agents [e.g. mono- or di- -($C_{2-4}$-alkylene)-glycols, glycerine or butane-1,3-diol].

Preferably the aqueous dispersions (P) of the invention contain, besides the above mentioned components (A), (C), (D) and optionally (B), (E), (F) or/and (G) and also water, no further additives. With particular preference the dispersions (P) of the invention consist essentially of (A), (C), (D), water and optionally one or more of the components (B), (E), (F) and (G).

The dispersions (P) of the invention are of very fine particle size and are distinguished by their storage stability.

The dispersions (P) of the invention serve as finishing agents for fibrous material and may, so as they have been composed, be directly employed for the formulation of application-liquors or may, if required, prior to the application from aqueous medium, be diluted with water to more diluted stock dispersions—as occasion demands. They are suitable for the finishing of fibrous material, principally textile material, from aqueous medium, especially in order to improve their handle and slippage properties.

Any textile material as occurring in textile industry is suitable, viz. natural as well as synthetic or semi-synthetic materials and mixtures thereof, in particular natural or regenerated or modified cellulose, natural or synthetic polyamide, polyester, polyurethane or polyacrylonitril containing materials and mixtures thereof (e.g. PES/CO and PAN/CO). The material may be in any processing form e.g. as loose fibers, filaments, threads, yarn strands, woven or knitted goods, non-woven webs, non-woven bonded webs, felts, carpets, velvet, tuftings or even half-ready-made or ready-made goods. Preferably open width or tubular textile fabrics (in particular knitted tubular goods) or piece goods are finished according to the invention.

The finishing is carried out expediently from aqueous distinctly acidic to weakly basic medium, in particular in the pH-range of 3.0 to 8.5. The concentration of the compositions of the invention referred to the substrate may vary broadly, depending on the kind and the constitution of the substrate and the desired effect and—calculated as sum of the components [(A)+(B)+(C)]—it amounts advantageously to values in the range of 0.01 to 2, preferably 0.1 to 1.5% by weight of [(A)+(B)+(C)] referred to the dry weight of the substrate.

The finishing of the invention is advantageously carried out as the last finishing stage of the material, preferably following a bleaching and/or an optical brightening and/or dyeing process, optionally together with a further treatment, e.g. an optical brightening and/or a synthetic resin finishing of the fibrous material. The finishing may be carried out by any methods conventional per se, e.g. by impregnation or exhaustion processes.

In exhaustion processes may come into consideration processes from long liquor as well as from short liquor, e.g. at liquor-to-goods ratios in the range of from 100:1 to 4:1, in particular between 60:1 and 5:1; the application temperature may also be in conventional scopes, in particular in the scope between ambient temperature and 60° C., preferably in the scope from 25° C. to 40° C.; the pH-value is preferably in the range of 4 to 8. The impregnation may also be carried out by methods conventional per se, e.g. by dipping, padding or foam application, preferably at temperatures in the range of from 15° to 40° C. and at pH-values in the range of from 4 to 8. After the impregnation procedure respectively after the exhaustion procedure the treated goods may be dried in conventional way, in particular at 30° to 180° C., preferably 60° to 140° C. Synthetic resin finishes may be fixed at conventional temperatures, in particular at 130° to 190° C., preferably 140° to 180° C.

The dispersions (P) are particularly suited for the application by impregnation methods as mentioned above, before all for the finishing of white goods.

By the finishing of the invention with (P) there may be achieved, besides an very pleasant and not undesirably "flowing" soft handle of high permanence of the textile material, also an improvement of its mechanical workability, especially its mechanical dry workability, before all of its sewability, while the sorptivity of the substrate is practically not impaired. The dispersions (P), in which the weight ratio (C)/(A) is <1, e.g. above 0.05, preferably in the range of 0.1:1 to 0.5:1, are particularly suited for an excellent improvement of the mechanical dry workability, before all of the sewability, while those in which the weight ratio (C)/(A) is ≧1, e.g. in the range of 1:1 to 10:1, in particular >1, preferably in the range of 1.2:1 to 4:1, are particularly suited for achieving an excellent softening finishing.

There are in particular achievable finished white goods of optimum whiteness.

In the following examples parts and percentages are by weight; the temperatures are indicated in degrees Celsius; parts by weight relate to parts by volume as grams to milliliters. C.I. stands for Colour Index.

The following waxes, polydiorganosiloxanes and surfactants and the following wax dispersions and polydiorganosiloxane dispersions produced therefrom are employed:

Oxidized waxes (A)

($A_1$) Partially saponified Fischer-Tropsch wax with the following specifications:

| | |
|---|---|
| solidification point (DGF M-III-4a) | 90–93° C. |
| dripping point (DGF M-III-3) | 105–115° C. |
| needle penetration (DGF M-III-9b) | 1–2 dmm |
| acid number | 10–14 |
| saponification number | 20–30. |

($A_2$) Oxidized microwax with the following specifications:

| | |
|---|---|
| dripping point | 98° C. |
| needle penetration ASTM-D-1321 | 2 dmm |
| acid number | 13 |
| saponification number | 30 |

($A_3$) Oxidized polyethylene wax with the following specifications:

| | |
|---|---|
| dripping point | 137° C. |
| needle penetration ASTM D-1321 | ≦ 0.5 dmm |
| density | 0.99 g/cm$^3$ |
| acid number | 30. |

($A_4$) Oxidized polyethylene wax with the following specifications:

| | |
|---|---|
| melting temperature | 127–137° C. |
| solidification point | 120–122° C. |
| density | 0.99 g/cm$^3$ |
| acid number | 20–24 |
| saponification number | 29–31 |
| needle penetration (DGF M-III-9b) | 1 dmm. |

Non-oxidized paraffin waxes (B)
Fully refined paraffin with the following specifications:

| | | |
|---|---|---|
| ($B_1$) | solidification point | 94–98° C. |
| | dripping point | 105–108° C. |
| | needle penetration (ASTM D-1321) | 1–3 dmm. |
| ($B_2$) | melting point | 56–58° C. |
| | needle penetration (ASTM D-1321) | 20 dmm. |
| ($B_3$) | dripping point | 88–93° C. |
| | needle penetration (ASTM D-1321) | 10–15dmm. |
| | density | 0.9 g/cm$^3$. |

Polydiorganosiloxanes (C)

($C_1$) Unitary aminofunctional* polydimethylsiloxane with reactive methoxyendgroups; amine number=0.15; viscosity=5000 cP.

($C_2$) Aminofunctional* polydimethylsiloxane with reactive hydroxy endgroups; amine number=0.036.

($C_3$) Unitary aminofunctional* polydimethylsiloxane with reactive methoxy endgroups with an amine number (before acetylation)=0.3 and a viscosity (before acetylation)=1000 cP, in which (75±5) mol-% of the aminogroups are acetylated.

($C_4$) Unitary aminofunctional** polydimethylsiloxane with trimethylsilyl endgroups; amine number=0.3; viscosity=1000 cP.

($C_5$) Polydimethylsiloxanediol with a viscosity of 3000–4000 cP. ($C_6$) Unitary aminofunctional* polydimethylsiloxane with trimethylsilyl endgroups; amine number=0.33; viscosity=900 cP.

\* with Si-linked group 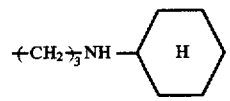
\*\* with Si-linked group of formula

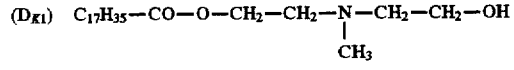

Surfactants ($D_O$)

($D_{O1}$) Addition product of 10 mols of ethyleneoxide to 1 mol of stearyl-alcohol.

($D_{O2}$) Addition product of 60 mols of ethyleneoxide to1 mol of stearyl-alcohol.

($D_{O3}$) Addition product of 5 mols of ethyleneoxide to 1 mol of lauryl-alcohol.

($D_{O4}$) Addition product of 9.5 mols of ethyleneoxide to 1 mol of technical isotridecylalcohol\*\*\*.

($D_{O5}$) Addition product of 4 mols of ethyleneoxide to 1 mol of technical isotridecylalcohol\*\*\*.

($D_{O6}$) Addition product of 6 mols of ethyleneoxide to 1 mol of 2,6,8-tri-methylnonanol-4 (Tergitol TMN-6, UNION CARBIDE).

($D_{O7}$) Stearic acid diethanolamide.

($D_{O8}$) Addition product of 8 mols of ethyleneoxide to 1 mol of technical $c_{13-15}$ -oxoalcohol\*\*\*\*.

($D_{O9}$) Addition product of 18 mols of ethyleneoxide to 1 mol of technical isotridecylalcohol\*\*\*.

\*\* technical isomeric mixture from the oxosynthesis;
\*\*\* technical isomeric mixture of branched, aliphatic, saturated $C_{13-15}$-alcohols from the oxosynthesis.

Surfactants ($D_K$)

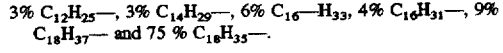

($D_{K2}$) Addition product of 7 mols of ethyleneoxide to 1 mol of tallow fatty amine.

($D_{K3}$) Addition product of 15 moles of ethyleneoxide to 1 mol of fatty amine, the fatty radical of which has the following composition:

3% $C_{12}H_{25}$—, 3% $C_{14}H_{29}$—, 6% $C_{16}$—$H_{33}$, 4% $C_{16}H_{31}$—, 9% $C_{18}H_{37}$— and 75 % $C_{18}H_{35}$—.

($D_{K4}$)Addition product of 2 moles of ethyleneoxyide to 1 mol of tallow fatty amine.

($D_{K5}$)Addition product of 5 mols of ethyleneoxide to 1 mol of tallow fatty amide.

Wax.dispersions (W)

($W_1$) Aqueous wax dispersion produced as follows:
141.3 parts of wax ($A_1$), 64.4 parts of hard paraffin ($B_1$) and 19.2 parts of emulsifier ($D_{O1}$) are melted together.

Subsequently at 125° C. 5.4 parts of a 30% sodium hydroxide solution are added thereto and when reaching an inner temperature of 135° C., a light vacuum is applied, by which 3.8 parts of water are distilled off. Now the clear melt is allowed to flow into 401.4 parts of boiling water with stirring, stirring is continued for a few minutes and the obtained dispersion is poured on 240.8 parts of ice. As soon as a stirrable liquid is formed the stirrer is set in motion and to the obtained emulsion are further added 131.3 parts of a solution of 39.3 parts of dispersant ($D_{O2}$) in 92.0 parts of water and then the obtained product is discharged.

($W_2$) Aqueous wax dispersion produced as follows:

134.0 parts of wax ($A_2$) and 134.0 parts of paraffin ($B_1$) are melted together at 110°–115° C. Subsequently at 115° C. 18 parts of dispersant ($D_{K3}$) and also 30.0 parts of dispersant ($D_{O7}$) and 30.0 parts of dispersant ($D_{K1}$) are added. Now there is further added 1.0 part of glacial acetic acid and the clear melt is allowed to flow into 452.0 parts of boiling water with stirring. Stirring is continued for a few minutes and then the obtained dispersion of 90°–95° C. is poured on 501.0 parts of ice. When a stirrable liquid is formed, the stirrer is set in motion. The obtained emulsion is further additioned with 8.0 parts of glacial acetic acid and then discharged.

($W_3$) Aqueous wax dispersion produced as follows:

140 parts of wax ($A_3$), 60 parts of hard paraffin ($B_3$), 60 parts of dispersant ($D_{K2}$), 600 parts of water, 1.26 parts of glacial acetic acid and 2 parts of sodium pyrosulphite are heated in an autoclave (superatmospheric pressure= 4.4 bar) to 145° C., with stirring, and subsequently the formed fine emulsion is cooled to room temperature.

($W_4$) Aqueous wax dispersion produced as follows:

168.7 parts of wax ($A_3$), 45.4 parts of wax ($A_4$), 50.7 parts of dispersant ($D_{K2}$), 6.9 parts of dispersant ($D_{K4}$), 6.9 parts of dispersant ($D_{K5}$), 4.3 parts of glacial acetic acid, 2.1 parts of sodium pyrosulphite and 715.0 of water are heated to 145° C. in an autoclave (superatmospheric pressure=4.4 bar) with stirring and subsequently cooled to ambient temperature.

Silicone Dispersions (S)

($S_1$) Aqueous dispersion of
- 32.9 parts of silicone ($C_1$)
- 1.8 parts of ($D_{O3}$)
- 4.2 parts of ($D_{O4}$)
- 0.2 parts of glacial acetic acid
- 5.0 parts of glycerine
- 55.9 parts of water.

pH 5.5. Average particle size below 1 μm.

($S_2$) DOW CORNING Q2-7419 emulsion, which is an aqueous dispersion of
- 34.5 parts of silicone ($C_2$) 3.5 parts of fatty alcohol polyglycolether 62.8 parts of water of pH 4.5. Average particle size below 1 μm.

($S_3$) Aqueous microdispersion of:
- 20.2 parts of silicone ($C_3$)
- 7.0 parts of surfactant ($D_{O5}$)
- 3.0 parts of surfactant ($D_{O4}$)
- 15.0 parts of dipropyleneglycol
- 0.5 parts of glacial acetic acid
- 0.2 parts of a 36.5 % hydrochloric acid solution
- 54.1 parts of water.

pH 4.0. Average particle size <0.1 μm.

(S4) WACKER FINISH CT 100 E which is an aqueous microdispersion of:
- 17.0 parts of silicone ($C_4$)
- 8.0 parts of fatty alcoholpolyglycolether
- 76.0 parts of water of pH 3.5. Average particle size <0.1 μm.

($S_5$) Aqueous dispersion of:
- 27.5 parts of silicone ($C_5$)
- 5.5 parts of silicone ($C_6$)
- 3.3 parts of surfactant ($D_{O6}$)
- 0.4 parts of glacial acetic acid
- 63.3 parts of water.

pH 6. Average particle size below 1 μm.

EXAMPLE 1

Dispersion ($P_1$)

375 parts of water are preset, then 125 parts of wax dispersion ($W_3$) and 500 parts of silicone dispersion ($S_2$) are added thereto at ambient temperature and stirred.

EXAMPLES 2

Dispersion ($P_2$)

The procedure described in Example 1 is repeated, with the difference that instead of ($S_2$) there is employed the same amount of ($S_1$)

EAMPLE 3

Dispersion ($P_3$)

674.5 parts of water are preset. Then at room temperature are added thereto in the sequence: first 250.0 parts of wax dispersion ($W_3$), then 25.0 parts of a 40 % aqueous cumene sulphonate sodium salt solution and then 0.5 parts of glacial acetic acid, by which the pH set to about 7.0. Subsequently 50.0 parts of silicone dispersion (S4) are also added thereto and the mixture is stirred and then discharged.

EXAMPLE 4 to 8

Dispersions ($P_4$) to ($P_8$)

The procedure described in Example 1 is repeated with the difference that the following components are admixed with stirring:

Dispersion ($P_4$): 700 parts of water, 250 parts of wax dispersion ($W_3$) and 50 parts of silicone dispersion ($S_1$).

Dispersion ($P_5$): 375 parts of water, 125 parts of wax dispersion ($W_4$) and 500 parts of silicone dispersion ($S_4$).

Dispersion (P6): 250 parts of water, 250 of wax dispersion ($W_1$) and 500 parts of silicone dispersion ($S_1$).

Dispersion ($P_7$): 550 parts of water, 250 parts of wax dispersion ($W_2$) and 200 parts of silicone dispersion ($S_3$).

Dispersion ($P_8$): 700 parts of water, 250 parts of wax dispersion ($W_2$) and 100 parts of silicone dispersion ($S_5$).

EXAMPLE 9

Dispersion ($P_9$)

A mixture of 345 parts of water, 20 parts of surfactant ($D_{O8}$) and 10 parts of surfactant ($D_{O9}$) is preset, then 125 parts of wax dispersion ($W_3$) and 500 parts of silicone dispersion ($S_2$) are added thereto at room temperature, with stirring.

APPLICATION EXAMPLE A TO J

The substrate is padded at room temperature (=20° C.) to a 100% pick-up with an aqueous liquor that contains $\underline{a}$ g/l of the products ($P_1$) to ($P_9$), $\underline{b}$ g/l of optical brightener C.I. Fluorescent Brightener 380, $\underline{c}$ g/l of an aqueous 50% dimethyloldihydroxyethyleneurea solution and $\underline{d}$ g/l of magnesium chloride. The padded material is then subjected to a thermal treatment. In the following table are set out the employed products (P) and the employed parameters $\underline{a}$, $\underline{b}$, $\underline{c}$ and $\underline{d}$ and also the conditions for the thermal treatment.

| Application | | Composition of the liquor | | | | | Thermal treatment | |
|---|---|---|---|---|---|---|---|---|
| Example | Substrate | (P) | $\underline{a}$ | $\underline{b}$ | $\underline{c}$ | $\underline{d}$ | Temperature | Duration |
| A | $T_1$ | ($P_1$) | 20 | 0 | 0 | 0 | 140° C. | 90 seconds |
| B | $T_3$ | ($P_2$) | 20 | 0 | 0 | 0 | 140° C. | 90 seconds |
| C | $T_2$ | ($P_3$) | 40 | 0,8 | 100 | 15 | 180° C. | 90 seconds |
| D | $T_2$ | ($P_4$) | 40 | 0,8 | 100 | 15 | 180° C. | 90 seconds |
| E | $T_1$ | ($P_5$) | 20 | 0 | 0 | 0 | 140° C. | 90 seconds |
| F | $T_3$ | ($P_6$) | 30 | 0 | 0 | 0 | 140° C. | 90 seconds |
| G | $T_4$ | ($P_7$) | 30 | 0 | 100 | 15 | 180° C. | 90 seconds |
| H | $T_2$ | ($P_8$) | 30 | 0,8 | 0 | 0 | 140° C. | 90 seconds |
| J | $T_1$ | ($P_9$) | 30 | 0 | 0 | 0 | 140° C. | 90 seconds |

The employed substrates $T_1$ to $T_4$ are the following:

T1 cotton tricot fabric, interlock, bleached, previously optically brightened;
T2 cotton tricot fabric, interlock, bleached;
T3 polyester/cotton intimate blend (50/50) tricot, dyed with reactive and disperse dyes;
T4 cotton fabric, dyed with reactive dyes.

The goods finished according to the above Application Examples A to J display an excellent pleasant soft handle of optimum fullness, which is neither "too flowing" nor displays the typical character of a "silicone soft-handle". The dyed or optically brightened substrates are not impaired in their colour respectively in their whiteness. The sewability is very good.

The soft-handle is assessed as well mechanically in a "handle-o-meter" (type 211-5 of the firm THÜRING ALBERT) as also manually with 10 different samples of a same finishing. The sewability is determined as described in DE 36 21 345 Al with the apparatus described therein for the sewability test.

I claim:

1. An aqueous, dispersant-containing wax- and polysiloxanedispersion (P) containing as wax
   (A) at least one oxidized hydrocarbon wax of needle-penetration according to ASTM D1321<<4 dmm and optionally
   (B) at least one non-oxidized hydrocarbon wax and as polydiorganosiloxane
   (C) at least one optionally amino-modified or non-ionically modified polydiorganosiloxane with a nitrogen-content 0.6% by weight wherein the weight ratio of (C)/(A) is in the range of 0.01:1 to 20:1.

2. An aqueous dispersion (P) according to claim, 1 further comprising a dispersant system which is
   (D) a non-ionogenic, cationic or amphoteric dispersant system.

3. An aqueous dispersion (P) according to claim 2 further containing
   (E) at least one acid and/or at least one base for pH-adjustment,
   (F) at least one organic solvent and/or hydrotrope and/or
   (G) at least one preserving agent and/or at least one perfume.

4. A process for the production of an aqueous dispersion (P) according to claim 1 optionally containing (D) a non-ionogenic, cationic or amphoteric dispersant system, (E) at least one acid and/or at least one base for pH-adjustment, (F) at least one organic solvent and/or hydrotrope and/or (G) at least one preserving agent and/or at least one perfume, wherein an aqueous wax-dispersion (W) containing wax (A) and, if present, (B), is admixed with an aqueous dispersion (S) of the polydiorganosiloxane (C) and optionally with (D), water and optionally one or more further additives (E), (F) and/or (G).

5. A process according to claim 4, wherein an aqueous dispersion (W') of (A) and optionally (B), which contains as dispersant system
   ($D_1$) at least one cationic surfactant ($D_K$), at least one amphoteric surfactant ($D_x$) and/or at least one non-ionogenic surfactant ($D_O$), is mixed with an aqueous dispersion (S') of (C), which contains as dispersant system
   ($D_2$) at least one non-ionogenic surfactant ($D_O$) and optionally at least one amphoteric surfactant ($D_x$) and/or at least one cationic surfactant ($D_K$), and optionally with further surfactant (D) and/or water.

6. A process for the finishing of fibrous material in which a dispersion (P) according to claim 1 is employed as a finishing agent by finishing the fibrous material with the dispersion (P) of claim 1.

7. A process according to claim 6 for the conclusive finishing of textile material in which the textile material is finished with the dispersion (P) of claim 1.

8. A process according to claim 6 for the production of optically brightened finished goods in which the optically brightened goods are finished with the dispersion (P) of claim 1.

9. A finishing agent for fibrous material which is an aqueous dispersion (P) as defined in claim 1.

10. A finishing agent according to claim 9 which is a softener composition for cellulosic textile white goods.

11. A composition according to claim 1 consisting essentially of (A), (C), (D), and water, and optionally comprising
    (B) at least one non-oxidized hydrocarbon wax,
    (E) at least one acid and/or at least one base for pH-adjustment,
    (F) at least one organic solvent and/or hydrotrope, and/or
    (G) at least one preserving agent and/or at least one perfume.

12. The aqueous, dispersant-containing wax- and polysiloxane-dispersion (P) according to claim 1 wherein the polydiorganosiloxane (C) is amino-modified and/or non-ionically modified.

* * * * *